US010090017B2

(12) United States Patent
Gartee

(10) Patent No.: US 10,090,017 B2
(45) Date of Patent: Oct. 2, 2018

(54) APPARATUS AND METHOD FOR DYNAMIC MULTIPLE ACTUATOR DRIVE DATA ACCESS

(71) Applicant: Delphi Memory Technologies, Inc., Folsom, CA (US)

(72) Inventor: Larry D. Gartee, El Dorado Hills, CA (US)

(73) Assignee: Delphi Memory Technologies, Inc., Folsom, CA (US)

( * ) Notice: Subject to any disclaimer, the term of this patent is extended or adjusted under 35 U.S.C. 154(b) by 0 days.

(21) Appl. No.: 14/641,387

(22) Filed: Mar. 8, 2015

(65) Prior Publication Data

US 2016/0260458 A1    Sep. 8, 2016

(51) Int. Cl.
| G11B 5/48 | (2006.01) |
| G11B 21/02 | (2006.01) |
| G06F 3/06 | (2006.01) |
| G11B 5/55 | (2006.01) |
| G11B 5/012 | (2006.01) |

(52) U.S. Cl.
CPC .......... *G11B 21/025* (2013.01); *G06F 3/0613* (2013.01); *G06F 3/0647* (2013.01); *G06F 3/0658* (2013.01); *G06F 3/0674* (2013.01); *G11B 5/4886* (2013.01); *G11B 5/5578* (2013.01); *G11B 5/012* (2013.01)

(58) Field of Classification Search
None
See application file for complete search history.

(56) References Cited

U.S. PATENT DOCUMENTS

| 5,081,552 A | 1/1992 | Glaser |
| 5,343,345 A | 8/1994 | Gilovich |
| 5,343,347 A | 8/1994 | Gilovich |
| 6,005,747 A | 12/1999 | Gilovich |
| 6,057,990 A | 5/2000 | Gilovich |

(Continued)

FOREIGN PATENT DOCUMENTS

| WO | WO2004064350 | 7/2004 |
| WO | WO2006044884 | 4/2006 |

OTHER PUBLICATIONS

Li, Mingqiang and Jiwu Shu, "DACO: A High-Performance Disk Architecture Designed Specially for Large-Scale Erasure-Coded Storage Systems", IEEE Transactions on Computers, vol. 59, No. 10, Oct. 2010.

*Primary Examiner* — Brian Butcher
(74) *Attorney, Agent, or Firm* — Inventive Patent Law P.C.; Jim H. Salter

(57) ABSTRACT

An apparatus and method for dynamic multiple actuator drive data access includes: partitioning a data package of a received data transfer request into a plurality of data segments; assigning actuator drivers and actuator controllers; initiating a data transfer to or from the data storage medium using one or more of the plurality of actuators corresponding to the one or more assigned actuator controllers; storing or retrieving an individual data package of the data transfer request to or from the data storage medium wherein the entire data package is wholly accessible to a single actuator, if the data transfer request is a random data mode request; and storing or retrieving an individual data segment of the data transfer request to or from the data storage medium wherein the data package is accessible to the plurality of actuators, if the request is a parallel data mode request.

10 Claims, 12 Drawing Sheets

(56) References Cited

U.S. PATENT DOCUMENTS

| | | |
|---|---|---|
| 6,563,657 B1 | 5/2003 | Serrano |
| 6,853,607 B1 | 2/2005 | Gilovich |
| 7,031,115 B1 | 4/2006 | Gilovich |
| 8,028,311 B2 | 8/2011 | Gilovich |
| 2004/0143733 A1 | 7/2004 | Ophir |
| 2009/0013342 A1 | 1/2009 | Gilovich |

APPARATUS AND METHOD FOR DYNAMIC MULTIPLE ACTUATOR DRIVE DATA ACCESS

TECHNICAL FIELD

This patent application relates to electronic systems, data storage devices, and computer-implemented software, according to various example embodiments, and more specifically to an apparatus and method for dynamic multiple actuator drive data access.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2013-2015 Delphi Memory Technologies, Inc., All Rights Reserved.

BACKGROUND

Disk-type memory devices are typically manufactured having a single actuator assembly mounted within the industry standard disk drive enclosures. The actuator assembly typically has a read/write head mounted at a distal end for reading optically encoded data, optically/magnetically encoded data, or magnetically encoded data from a rotating disk or platter mounted on a disk hub or spindle. Data writes to a disk drive with a single actuator with one read/write head per disk allows for only one write or read from the platter at a time, which limits the amount of data that can be transferred between the platter and a host system.

Many conventional data storage systems consist of one or more storage platters with a single actuator arm for reading and writing data from/to the tracks and sectors of the platter. All read/write heads of the actuator must move as a single unit and can only access the same sector and track of each disk simultaneously, which requires the actuator to physically move its location to access data on a different track. As a result, data access delays are produced in conventional single actuator data storage systems.

Memory devices for storing magnetically encoded data and having multiple actuator assemblies are present in the art. For example, U.S. Pat. No. 5,081,552 (Glaser et al.), describes a rigid magnetically encoded data disk with a disk drive head assembly having a pair of actuator assemblies. Unfortunately, as is the problem with other attempts at providing a multiple actuator disk drive, the Glaser et al. disk drive requires at least two different and distinct transducer heads. The special transducer heads of Glaser et al. are expensive to manufacture.

U.S. Pat. No. 5,343,345 (Gilovich) and U.S. Pat. No. 5,343,347 (Gilovich) also describe a disk drive transducer head assembly having multiple actuators, which requires at least two different and distinct transducer heads unless, in the case of two actuators, the actuators are positioned in diagonal corners.

U.S. Pat. No. 6,057,990 (Gilovich) describes a data storage device having a first data storage disk and a first actuator arm assembly having at least one arm. Each of the arms have a distal end carrying a read/write transducer head for reading information from and writing information to only the first data storage disk. The data storage device comprises a second data storage disk and a second actuator arm assembly having at least one arm. Each arm has a distal end carrying a read/write transducer head with the read/write transducer head reading information from and writing information to only the second data storage disk.

U.S. Pat. No. 6,563,657 (Serrano) describes a hard disk drive for a computer system having at least two actuators for reading data from or writing data to the disks. The actuators may be configured to support the different methods of data access required of them. For example, if large quantities of sequential data are performed, one operation uses both actuators to increase throughput. However, if mostly random operations are to be performed, then independent usage of the actuators is preferred. These two methods of usage can be supported simultaneously and dictated by the user. The tracking format of the actuators can be configured such that the next logical track is physically located under a head on a different actuator to improve sequential operation. The actuators also may be utilized in a dual-channel configuration so that data can be written to both actuators at the same time, or read back at the same time to improve throughput. In addition, either of these configurations can be selected on a transfer-by-transfer basis by the user. However, as described in Serrano, the multiple actuators are mounted to a common shaft of a single pivot cartridge assembly. Each actuator comprises a plurality of stacked, parallel actuator arms in the form of a comb that is pivotally mounted to a base about a pivot cartridge assembly. In this configuration with multiple actuators mounted to a common shaft, each actuator is travelling the full radius of the disk and incurring maximal seek times. Further, because the multiple actuators mounted to a common shaft, individual actuators cannot be positioned at different locations around the disk.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
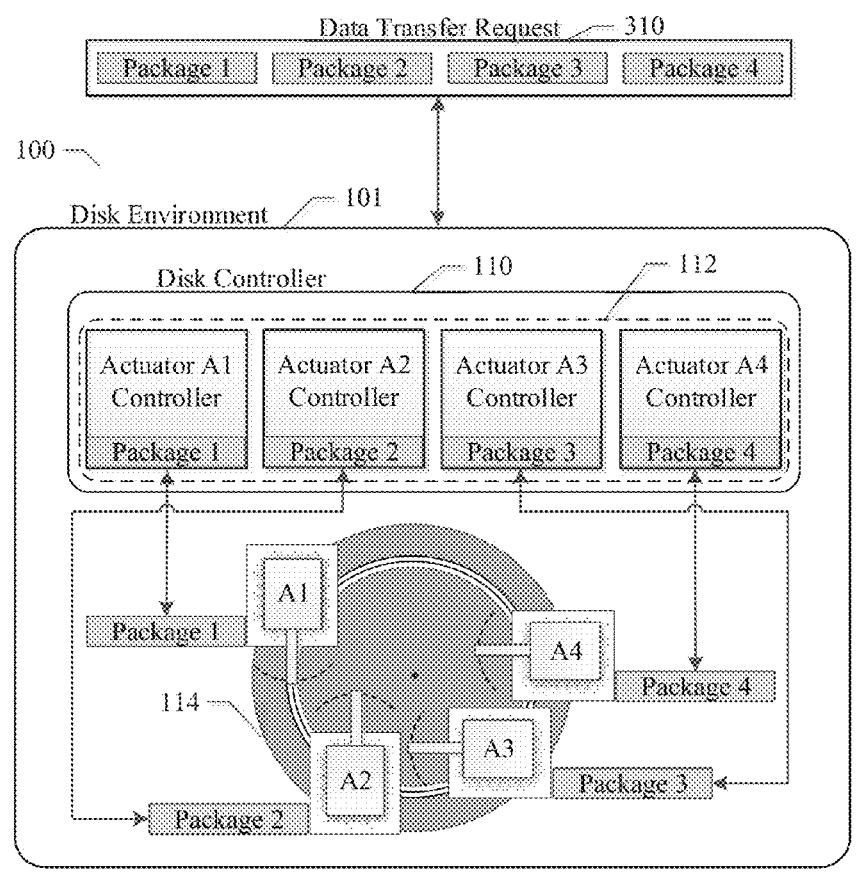
FIG. 1 illustrates the multiple actuator data storage system of an example embodiment.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, an apparatus and method for dynamic multiple actuator drive data access are disclosed. An example embodiment provides a hard disk drive data storage system for a computer system/storage array, wherein the data storage system has at least two actuators for reading and writing data to the memory platters of the disk system. The behavior of the actuators when accessing the data either for writing or reading can be dependent on the type of data and the method by which the data is accessed (e.g., the data transfer mode). The behavior of the actuators can be dynamically determined with the ability of the actuator behavior to be modified by the processing logic of the drive either by profiles defined in the firmware or by external sources, such as an attached computer system. For example, if the data being written to the data storage system by an application would benefit from a parallel method of data access, all actuators within the disk storage system can be configured to operate together (e.g., in tandem) thereby providing the maximum performance in a parallel data mode. Alternatively, if the data being written to the data storage system by an application would benefit from a random method of data access, all actuators within the disk storage system can be configured to operate independently of each other thereby providing the maximum performance in a random data mode.

The various embodiments described herein improve the behavior of a multiple actuator drive by allowing either the host computer system/storage array or the firmware to dynamically modify the operation of the disk actuators to work as a single data path in a parallel mode or as multiple independent paths in a random mode for access to data stored on the data storage platter. The various embodiments are not limited by the number of actuators available in a particular data storage system. In the various embodiments described herein, the firmware of the multiple actuator drive is designed to allow each of the data read/write data paths to be dynamically configured for data access defined by either the host computer system/storage array or defined by a data access profile within the firmware in the disk environment. This allows the disk actuators to work as a single data path or multiple data paths depending on the best data access method for the data types at the time of access. The data access methods can be configured for each actuator subsystem simultaneously so that: 1) each actuator can be configured to work independently to provide a maximal number of multiple data paths, 2) actuators can be configured to work together in pairs or other combinations to provide a fewer number of multiple data paths, or 3) actuators can be configured to all work together to provide a single data path. The various embodiments include the ability to dynamically change the disk actuator operational method as the data type changes.

The multiple actuator data storage system of the example embodiments provides additional advantages. As described in more detail below, the multiple actuator data storage system provides multiple actuators, each mounted on a different shaft at different locations around the surface of the disk. As a result, each actuator can be configured to read/write data from/to the disk from a different location on the disk without interfering with other actuators. Moreover, the actuators can be configured to access only a portion of the available tracks on the disk and different subsets of the available tracks. In this configuration, the actuators do not incur the maximal seek times that traditional actuators incur when moving, for example, from an outermost track to an innermost track. As a result, the multiple actuator data storage system of the example embodiments provides faster data access and more versatile operation.

The foregoing and other objects and advantages of the example embodiments will be apparent to those of ordinary skill in the art in view of the detailed description of the various example embodiments of the present invention as described herein.

FIG. 1 illustrates the multiple actuator data storage system 100 of an example embodiment. The example embodiment includes a disk controller 110 operating in a disk environment 101. The disk environment 101 represents the data storage media, the software, firmware, and external hardware with which the disk controller 110 interacts or interfaces with the external systems, such as a host computing platform. The disk environment 101 enables data stored on a data storage disk 114 to be read or written using the various methods described herein. The data storage disk 114 (e.g., the data storage medium) can comprise one or a plurality of various-sized, industry standard form factor data storage disks 114 mounted on a hub of a disk drive motor (e.g., disk spindle shaft), which can spin the disk 114. The disk 114 can be configured for data storage using magnetic, optical, or other conventional data coding and storage techniques.

In an example embodiment, a plurality of actuators (denoted A1, A2, A3, and A4 in FIG. 1) can be positioned at different locations on or adjacent to the disk 114. Although four actuators are shown in the diagrams herein, it will be apparent to those of ordinary skill in the art in view of the disclosure herein that any number of actuators can be used within the scope of the example embodiments. Each actuator A1-A4 can include an assembly for read/write transducer head positioning above the disk 114. In an example embodiment, each actuator A1-A4 can include voice coil motors (VCMs) to move or rotate a single actuator arm or a rotatable stack of actuator arms, each supporting a read/write transducer head on the free distal end of a flexure. Each actuator arm or actuator assembly can include a flexure and a transducer head for reading or writing data from/to the disk 114. The actuator arm or a rotatable stack of actuator arms can be rotatably mounted to an actuator spindle shaft fastened to a baseplate. In an example embodiment, each actuator A1-A4 is mounted on a different actuator spindle shaft and positioned at different locations on or adjacent to the disk 114 as shown in FIG. 1. In this configuration, each actuator A1-A4 can be positioned above or adjacent to a different portion of disk 114. Moreover, the plurality of actuators A1-A4 can be positioned above specific tracks of disk 114. In a particular embodiment, each actuator can be positioned adjacent to a subset (less than all) of the available tracks on disk 114. The actuator arm of each actuator can be configured to rotate only through the pre-defined subset of tracks. In this manner, each actuator does not need to be configured to rotate across the entire set of tracks on disk 114. As a result, data access to a particular track can be performed more quickly by an actuator positioned adjacent to the desired track. As described in more detail below, this technique is used in an example embodiment to partition data into packages or segments that can be read or written using a corresponding plurality of actuators that can complete the data transfer much more quickly than standard single actuator disk systems or multiple actuator assemblies mounted on a single, common shaft.

As shown in FIG. 1, the disk controller 110 can include a plurality of actuator controllers 112 with which the disk controller 110 controls and transfers data between a corresponding plurality of actuators A1-A4 positioned at different locations on the data storage disk 114. Each actuator controller 112 can be implemented with software components, firmware components, or hardware components, such as semiconductor chips, application specific integrated circuits (ASICs), field programmable gate arrays (FPGAs), discrete logic circuits, switch logic, or other circuitry or logic for implementing the functionality described herein. It will be apparent to those of ordinary skill in the art in view of the disclosure herein that a variety of standard software or hardware components, or combinations thereof, can be used to implement the actuator controllers 112 as described herein. The disk controller 110 can also be configured to include a conventional microcontroller (not shown) to control the data transfer operations and the operation of the actuator controllers 112. Each of the actuator controllers 112 are associated with a unique one of the plurality of actuators A1-A4. Each actuator controller 112 is responsible for controlling and transferring data to/from its corresponding actuator A1-A4. Although each actuator controller 112 and its corresponding actuator A1-A4 operate independently of the other actuator controllers 112 and their corresponding actuators A1-A4, the various embodiments described herein can, nevertheless, combine the operation of two or more or various combinations of actuator/actuator controller pairs. As a result, the width of the data path into and out of the disk environment 101 can be dynamically varied. This aspect of an example embodiment is described in more detail below.

Referring again to FIG. 1, a typical data transfer request 310 is shown. Such a data transfer request 310 can be originated by a host, which can be an external subsystem or a computing platform and an application or system software component executing thereon. In the example shown in FIG. 1, the sample data transfer request 310 is a data write request that represents a command to transfer data from the host to the disk environment 101 for storage on the disk 114. In a similar manner, the sample data transfer request 310 can also be a data read request that represents a command to transfer data stored on the disk 114 to the host via the disk environment 101.

As is often done in conventional computing systems, the typical data transfer request 310 includes a data block, which is partitioned into a plurality of sub-units or data packages. Each data package of the data transfer request 310 can be a pre-defined number of bytes in length as determined by various system requirements including, the width of the data communication interface, the capabilities of the processor being used, the requirements of the operating system, file system, or protocols in use, the capacity and efficiency of the network, buffer sizes, and the like. In many cases, the length of each data package is a fixed maximum length, though variable length data packages can be supported as well.

As shown in FIG. 1, the data transfer request 310 can be received by the disk environment 101 and the disk controller 110 therein. This interface is described in more detail below. The disk controller 110 can receive the data transfer request 310 and assign the data packages of the data transfer request 310 to particular actuator controllers 112. In a particular embodiment, the data transfer request 310 can include data indicative of a particular data transfer mode selected by the originator of the data transfer request 310. In the example embodiment, the data transfer mode can include a parallel data mode or a random data mode. The parallel data mode can correspond to a transfer of one or more data blocks that are large, contiguous, or most efficiently stored in a common memory region. The random data mode can correspond to a transfer of one or more data blocks that are short, choppy, randomly accessed, and most efficiently stored in separate or easily-accessible memory regions. It will be apparent to those of ordinary skill in the art in view of the disclosure herein that a variety of other data transfer modes can be similarly defined to accommodate the particular types of data transfers in a particular data processing system. In a particular embodiment, the data transfer mode can be inferred by the type of data being transferred, the length of the data packages, the identity of the originator of the data transfer request, the identity of the destination of the data transfer, and/or a variety of other characteristics of the particular data transfer request. In a system where the data transfer mode can be inferred from the data transfer request, the data indicative of a particular data transfer mode would not need to be explicitly included as part of the data transfer request. Additionally, the data transfer mode used to transfer the data for the received data transfer request 310 can also be specified in a disk environment profile maintained in the disk environment 101. The disk environment profile can be configured or modified at disk format time, at system boot time, or at operational run time.

Referring again to FIG. 1, the sample data transfer request 310 is shown as a random data mode request. This mode can be specified by the host as part of the data transfer request 310 or inferred by the plurality of partitioned data packages received as part of the data transfer request 310. In this example, once the data transfer mode is determined, the disk controller 110 can follow the pre-programmed logic associated with the random data mode request. In this case, the disk controller 110 can receive the data transfer request 310 and assign the individual data packages of the data transfer request 310 to particular actuator controllers 112. As a result of this assignment operation, each entire data package of the data transfer request 310 can be assigned to a single, unique actuator controller 112. If there is only one data package in the random data mode request, only one actuator controller 112 receives the assigned data package and the remaining unassigned actuator controllers 112 and corresponding unassigned actuators can remain inactive.

As shown in FIG. 1, once the disk controller 110 assigns an individual data package of the data transfer request 310 to a particular actuator controller 112, the disk controller 110 can dispatch the particular assigned actuator controller 112 to initiate the data transfer to/from the disk 114 using the actuator A1-A4 that corresponds to the particular assigned actuator controller 112. In this manner, each assigned actuator controller 112 and its corresponding actuator A1-A4 can initiate the transfer of a corresponding data package independently of the other actuator controllers 112 and corresponding actuators A1-A4. In the case of a random mode data transfer request with multiple data packages, each data package can be transferred by an independent actuator controller/actuator pair, so the transfer of each data package can be performed concurrently. As a result, the transfer of multiple random data packages using the systems and techniques described herein can be accomplished very quickly and efficiently.

Figure 2:
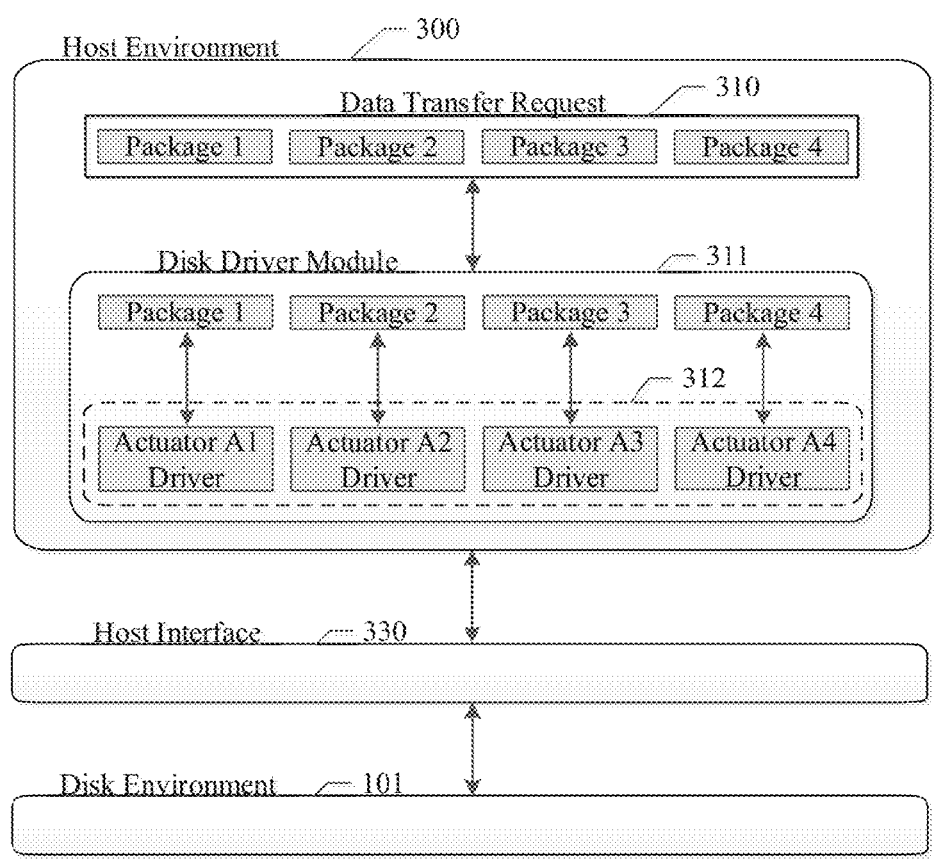
FIG. 2 illustrates the host side environment in an example embodiment of the multiple actuator data storage system.

FIG. 2 illustrates the host side environment 300 in a typical embodiment of the multiple actuator data storage system. As described above, a host can represent an external subsystem or a computing platform and an application or system software component executing thereon. Various components of the host environment 300 can generate data transfer requests, such as data transfer request 310. As described above, the data transfer requests can include one or more data packages. The host can use the data transfer requests to issue commands to the disk environment 101 for the transfer of the data packages between the host and the data storage medium 114.

The host environment 300 can also include a disk driver module 311, which comprises a plurality of drivers corresponding to each of the actuators A1-A4 of disk environment 101. Each driver can be implemented as a set of processing logic embodied in software, firmware, or electronic components.

The host environment 300 and/or the disk driver module 311 of an example embodiment can also include logic for receiving and processing the data transfer request received from an application or system software component executing in the host environment 300. This data transfer request processing logic can determine a data transfer mode associated with the particular data transfer request. As described above, the data transfer mode can be explicitly defined as part of the data transfer request, inferred from the data transfer request, or obtained from a disk environment profile. In an example embodiment, the data transfer modes can include a parallel data mode or a random data mode. It will be apparent to those of ordinary skill in the art in view of the disclosure herein that a variety of other data transfer modes can be similarly defined to accommodate the particular types of data transfers in a particular data processing system. In the example embodiment shown in FIG. 2, the sample data transfer request 310 is shown as a random data mode request. In this example, once the data transfer mode is determined, the disk driver module 311 can follow the pre-programmed logic associated with the random data mode request. In this case, the disk driver module 311 can receive the data transfer request 310 and assign the individual data packages of the data transfer request 310 to particular actuator drivers 312. As a result of this assignment operation, each entire data package of the data transfer request 310 can be assigned to a single, unique actuator driver 312. If there is only one data package in the random data mode request, only one actuator driver 312 receives the assigned data package and the remaining unassigned actuator drivers 312 can remain inactive.

As shown in FIG. 2, once the disk driver module 311 assigns an individual data package of the data transfer request 310 to a particular actuator driver 312, the disk driver module 311 can dispatch the particular assigned actuator driver 312 to initiate the data transfer to/from the disk environment 101 via host interface 330 as described above. The host interface 330 can be implemented as any conventional data interface or data transfer protocol. In this manner, each assigned actuator driver 312 can initiate the transfer of a corresponding data package independently of the other actuator drivers 312. In the case of a data transfer request with multiple data packages, each data package can be transferred by an independent actuator driver 312, so the transfer of each data package can be performed concurrently. As a result, the transfer of multiple random data packages using the systems and techniques described herein can be accomplished very quickly and efficiently.

Figure 3:
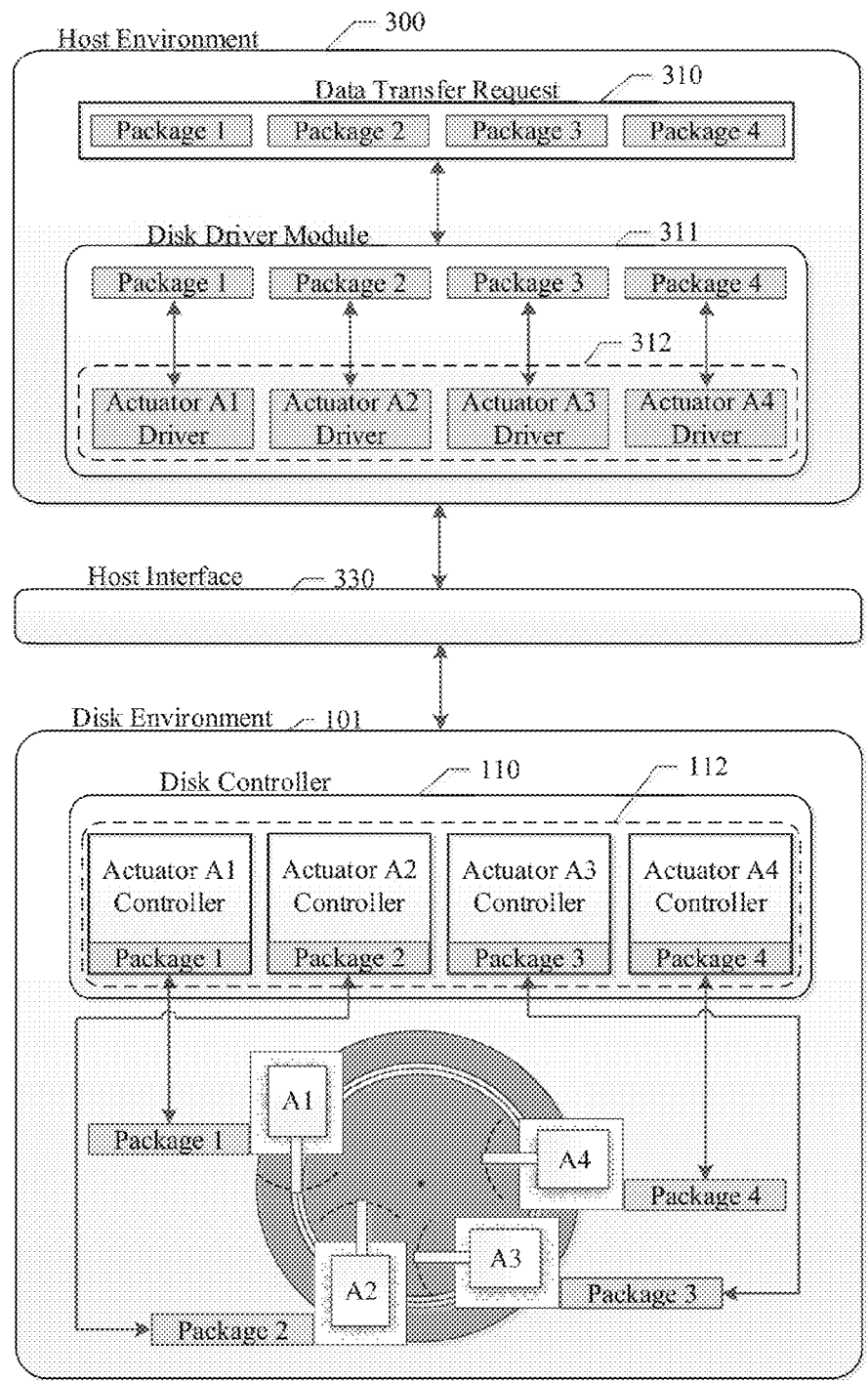
FIG. 3 illustrates an example embodiment including both the host side environment and the disk environment.

FIG. 3 illustrates an example embodiment including both the host side environment 300 and the disk environment 101. As shown for a sample random data transfer request 310, the disk driver module 311 of host environment 300 can determine a data transfer mode associated with the particular data transfer request 310. The disk driver module 311 can assign the individual data packages of the data transfer request 310 to particular actuator drivers 312 based on the data transfer mode. Then, the disk driver module 311 can dispatch the particular assigned actuator driver 312 to initiate the data transfer to/from the disk environment 101 via host interface 330.

Referring still to FIG. 3, the individual data packages of the data transfer request 310 dispatched from the particular actuator drivers 312 can be received by the disk environment 101 and the disk controller 110 therein. The disk controller 110 can receive the data packages of the data transfer request 310 from corresponding actuator drivers 312. The disk controller 110 can assign the individual data packages of the data transfer request 310 to particular actuator controllers 112 corresponding to the actuator drivers 312 from which the data packages were received. As a result of this assignment operation, each entire data package of the data transfer request 310 can be assigned to a single, unique actuator controller 112. As described above, once the disk controller 110 assigns an individual data package of the data transfer request 310 to a particular actuator controller 112, the disk controller 110 can dispatch the particular assigned actuator controller 112 to initiate the data transfer to/from the disk 114 using the actuator A1-A4 that corresponds to the particular assigned actuator controller 112. In the embodiment described above for a data transfer request and a random data mode, each data package of the data transfer request is wholly stored in an area of the disk 114 that is accessible to a single assigned actuator A1-A4. Additionally, each assigned actuator controller 112 and its corresponding actuator A1-A4 can initiate the transfer of a corresponding data package independently of the other actuator controllers 112 and corresponding actuators A1-A4.

In the case of a data read request, the process described above can be generally performed in a similar manner. In particular, the data read request can include one or more data packages into which data retrieved from the data storage medium 114 can be stored. As described above, the actuator drivers 312, actuator controllers 112, and actuators A1-A4 can be assigned to individual data packages to facilitate the retrieval and transfer of the requested data from the data storage medium 114, through the disk environment 101, the host interface 330, the disk driver module 311, to the requesting application or system software component of host environment 300.

Figure 4:
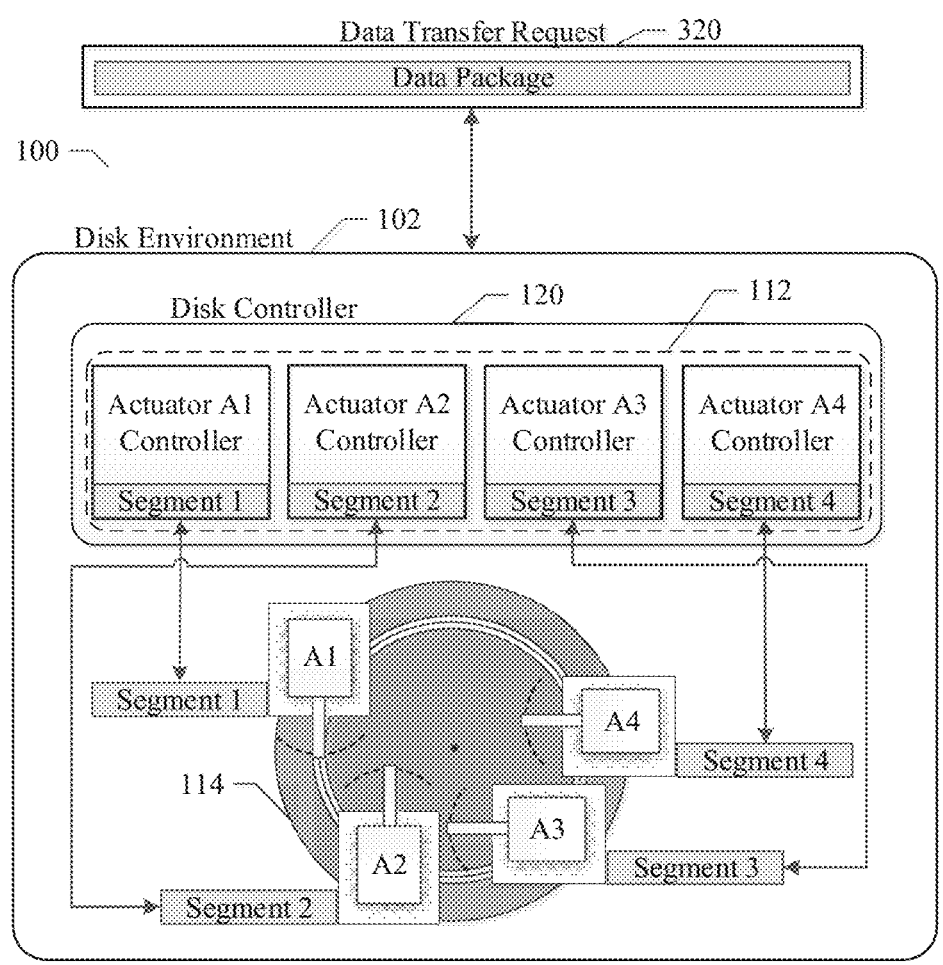
FIG. 4 illustrates another example embodiment of the multiple actuator data storage system.

FIG. 4 illustrates another example embodiment of the multiple actuator data storage system 100. As with the embodiment described above in connection with FIGS. 1 through 3, the embodiment of FIG. 4 includes a disk controller 120 operating in a disk environment 102. The disk controller 120 can include a plurality of actuator controllers 112 with which the disk controller 120 controls and transfers data between a corresponding plurality of actuators A1-A4 positioned at different locations on the data storage disk 114. As shown in the example of FIG. 4, the disk environment 102 can receive a data transfer request 320 as shown. Such a data transfer request 320 can be originated by a host, which can be an external subsystem or a computing platform and an application or system software component executing thereon. In the example shown in FIG. 4, the sample data transfer request 320 is a data write request that represents a command to transfer data from the host to the disk environment 102 for storage on the disk 114. In a similar manner, the sample data transfer request 320 can also be a data read request that represents a command to transfer data stored on the disk 114 to the host via the disk environment 102.

In the example shown in FIG. 4, the data package of the data transfer request 320 can be a single large block of data that is too big to be efficiently transferred directly to the disk environment 102. In other examples, the data transfer request 320 can include a plurality of large data blocks, each of which are also too big to be efficiently transferred directly to the disk environment 102. Such large data blocks are common in image or video processing systems. In these cases, the disk controller 120 of the example embodiment of FIG. 4 can partition the data package of the data transfer request 320 into a plurality of data segments. The size of each data segment can be a pre-configured length to correspond to an efficient size for storage on disk 114. The disk controller 120 can determine the need to partition the data package into smaller segments based on the size of the received data package or any data in the data transfer request 320 that is indicative of a particular data transfer mode. As described above, the data transfer request 320 can include data indicative of a particular data transfer mode selected by the originator of the data transfer request 320. The data transfer mode can be explicitly defined as part of the data transfer request, inferred from the data transfer request, or obtained from a disk environment profile. In the example embodiment, the data transfer mode can include a parallel data mode or a random data mode. The parallel data mode can correspond to a transfer of one or more data blocks that are large, contiguous, or most efficiently stored in a common memory region. The random data mode can correspond to a transfer of one or more data blocks that are short, choppy, randomly accessed, and most efficiently stored in separate or easily-accessible memory regions. The data transfer request 320 of FIG. 4 represents a data package that is most efficiently processed in a parallel data mode. In this example, once the data transfer mode is determined, the disk controller 120 can follow the pre-programmed logic associated with the parallel data mode request. As a result, the disk controller 120 can determine the need to partition the data package of the data transfer request 320 into smaller segments (shown in FIG. 4 as Segment 1, Segment 2, Segment 3, and Segment 4). It will be apparent to those of ordinary skill in the art in view of the disclosure herein that an arbitrary number of segments can be generated from the data package of the data transfer request 320. Once the disk controller 120 partitions the data package into smaller data segments, the disk controller 120 can assign the individual data segments to particular actuator controllers 112. As a result of this assignment operation, each entire data segment for the data package of the data transfer request 320 can be assigned to a single, unique actuator controller 112.

As shown in FIG. 4, once the disk controller 120 assigns an individual data segment of the data transfer request 320 to a particular actuator controller 112, the disk controller 120 can dispatch the particular assigned actuator controller 112 to initiate the data transfer to/from the disk 114 using the actuator A1-A4 that corresponds to the particular assigned actuator controller 112. In this manner, each assigned actuator controller 112 and its corresponding actuator A1-A4 can initiate the transfer of a corresponding data segment independently of the other actuator controllers 112 and corresponding actuators A1-A4. In the case of a data transfer request with multiple data segments, each data segment can be transferred by an independent actuator controller/actuator pair, so the transfer of each data package can be performed concurrently. As a result, the transfer of multiple parallel data segments using the systems and techniques described herein can be accomplished very quickly and efficiently.

Figure 5:
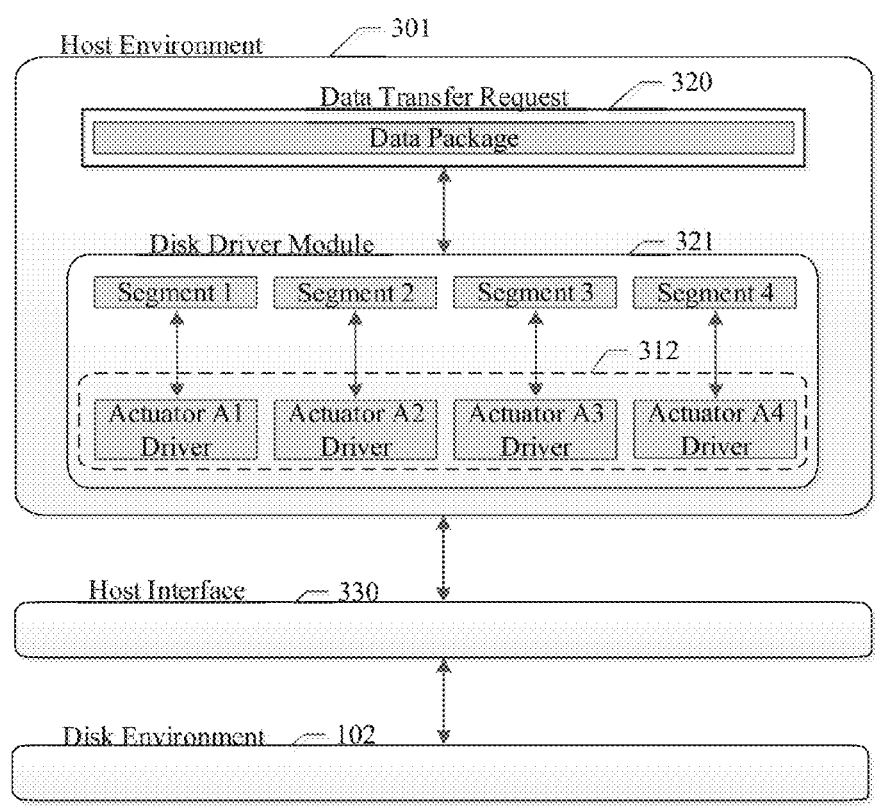
FIG. 5 illustrates the host side environment in another embodiment of the multiple actuator data storage system.

FIG. 5 illustrates the host side environment 301 in another embodiment of the multiple actuator data storage system. As described above, a host can represent an external subsystem or a computing platform and an application or system software component executing thereon. Various components of the host environment 301 can generate data transfer requests, such as data transfer request 320. As described above, the data transfer requests can include one or more data packages. The host can use the data transfer requests to issue commands to the disk environment 102 for the transfer of the data packages between the host and the data storage medium 114.

The host environment 301 can also include a disk driver module 321, which comprises a plurality of drivers corresponding to each of the actuators A1-A4 of disk environment 102. Each driver can be implemented as a set of processing logic embodied in software, firmware, or electronic components.

The host environment 301 and/or the disk driver module 321 of an example embodiment can also include logic for receiving and processing the data transfer request received from an application or system software component executing in the host environment 301. This data transfer request processing logic can determine a data transfer mode associated with the particular data transfer request. As described above, the data transfer mode can be explicitly defined as part of the data transfer request, inferred from the data transfer request, or obtained from a disk environment profile. In an example embodiment, the data transfer modes can include a parallel data mode or a random data mode. It will be apparent to those of ordinary skill in the art in view of the disclosure herein that a variety of other data transfer modes can be similarly defined to accommodate the particular types of data transfers in a particular data processing system. In the example embodiment shown in FIG. 5, the sample data transfer request 320 is shown as a parallel data mode request. In this example, once the data transfer mode is determined, the disk driver module 321 can follow the pre-programmed logic associated with the parallel data mode request. In this case, the disk driver module 321 can receive the data transfer request 320, partition the data package of the data transfer request 320 into a plurality of data segments, and assign the individual data segments of the data transfer request 320 to particular actuator drivers 312. As a result of this assignment operation, each entire data segment of the data transfer request 320 can be assigned to a single, unique actuator driver 312.

As shown in FIG. 5, once the disk driver module 321 assigns an individual data segment of the data transfer request 320 to a particular actuator driver 312, the disk driver module 321 can dispatch the particular assigned actuator driver 312 to initiate the data transfer to/from the disk environment 102 via host interface 330 as described above. The host interface 330 can be implemented as any conventional data interface or data transfer protocol. In this manner, each assigned actuator driver 312 can initiate the transfer of a corresponding data segment independently of the other actuator drivers 312. In the case of a data transfer request with multiple data segments, each data segment can be transferred by an independent actuator driver 312, so the transfer of each data segment can be performed concurrently. As a result, the transfer of multiple parallel data segments using the systems and techniques described herein can be accomplished very quickly and efficiently.

Figure 6:
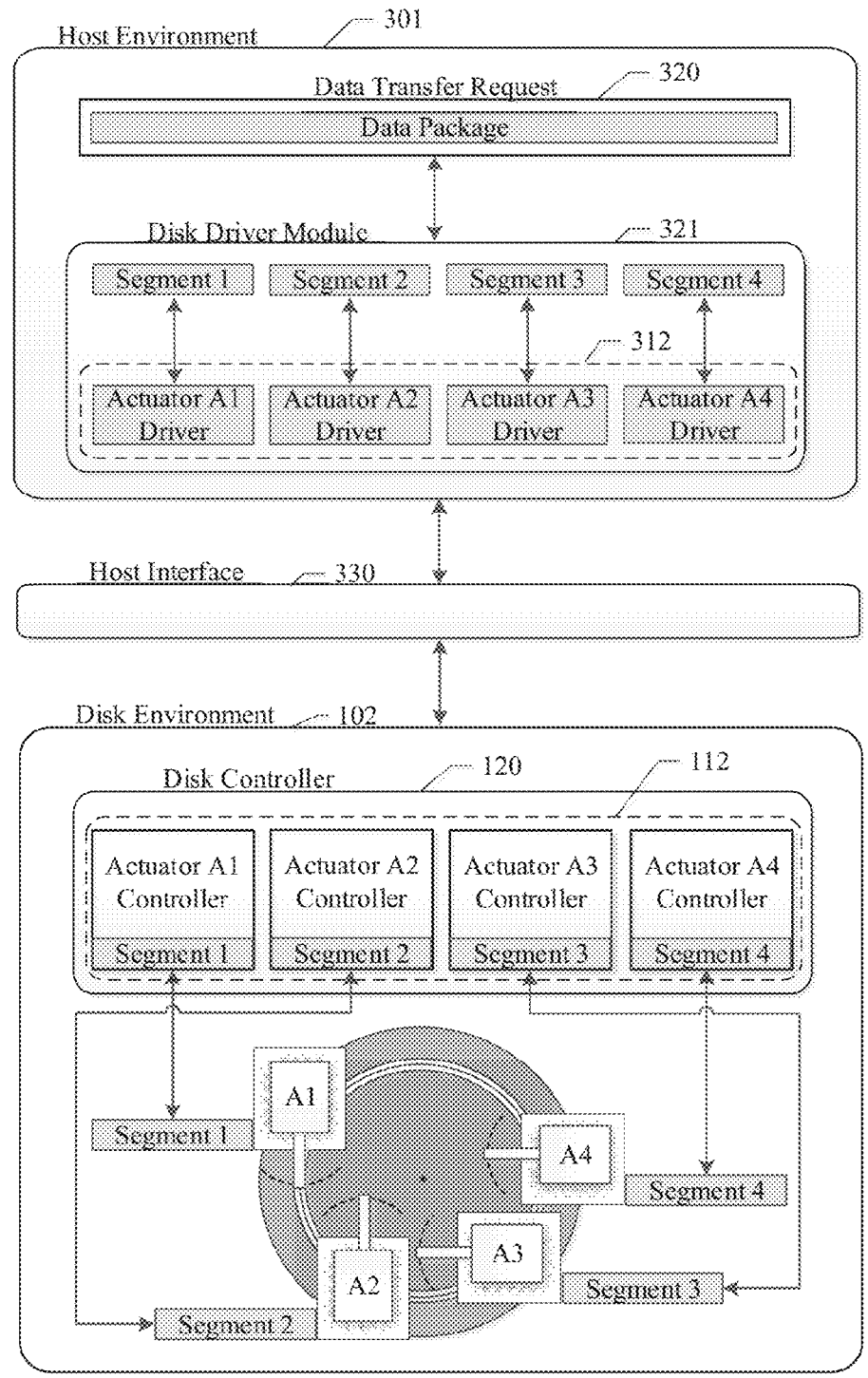
FIG. 6 illustrates another example embodiment including both the host side environment and the disk environment.

FIG. 6 illustrates an example embodiment including both the host side environment 301 and the disk environment 102. As shown for a sample parallel data transfer request 320, the disk driver module 321 of host environment 301 can determine a data transfer mode associated with the particular data transfer request 320. The disk driver module 321 can partition the data package of the data transfer request 320 into a plurality of data segments and assign the individual data segments of the data transfer request 320 to particular actuator drivers 312 based on the data transfer mode. Then, the disk driver module 321 can dispatch the particular assigned actuator driver 312 to initiate the data transfer to/from the disk environment 102 via host interface 330.

Referring still to FIG. 6, the individual data segments of the data transfer request 320 dispatched from the particular actuator drivers 312 can be received by the disk environment 102 and the disk controller 120 therein. The disk controller 120 can receive the data segments of the data transfer request 320 from corresponding actuator drivers 312. The disk controller 120 can assign the individual data segments of the data transfer request 320 to particular actuator controllers 112 corresponding to the actuator drivers 312 from which the data segments were received. As a result of this assignment operation, each entire data segment of the data transfer request 320 can be assigned to a single, unique actuator controller 112. As described above, once the disk controller 120 assigns an individual data segment of the data transfer request 320 to a particular actuator controller 112, the disk controller 120 can dispatch the particular assigned actuator controller 112 to initiate the data transfer to/from the disk 114 using the actuator A1-A4 that corresponds to the particular assigned actuator controller 112. In the embodiment described above for a data transfer request and a parallel data mode, each data package of the data transfer request is wholly stored in an area of the disk 114 that is accessible to multiple assigned actuators A1-A4. Additionally, each assigned actuator controller 112 and its corresponding actuator A1-A4 can initiate the transfer of a corresponding data segment independently of the other actuator controllers 112 and corresponding actuators A1-A4.

In the case of a data read request, the process described above can be generally performed in a similar manner. In particular, the data read request can include one or more data packages into which data retrieved from the data storage medium 114 can be stored. As described above, the actuator drivers 312, actuator controllers 112, and actuators A1-A4 can be assigned to individual data segments to facilitate the retrieval and transfer of the requested data from the data storage medium 114, through the disk environment 102, the host interface 330, the disk driver module 321, to the requesting application or system software component of host environment 301.

Figure 7:
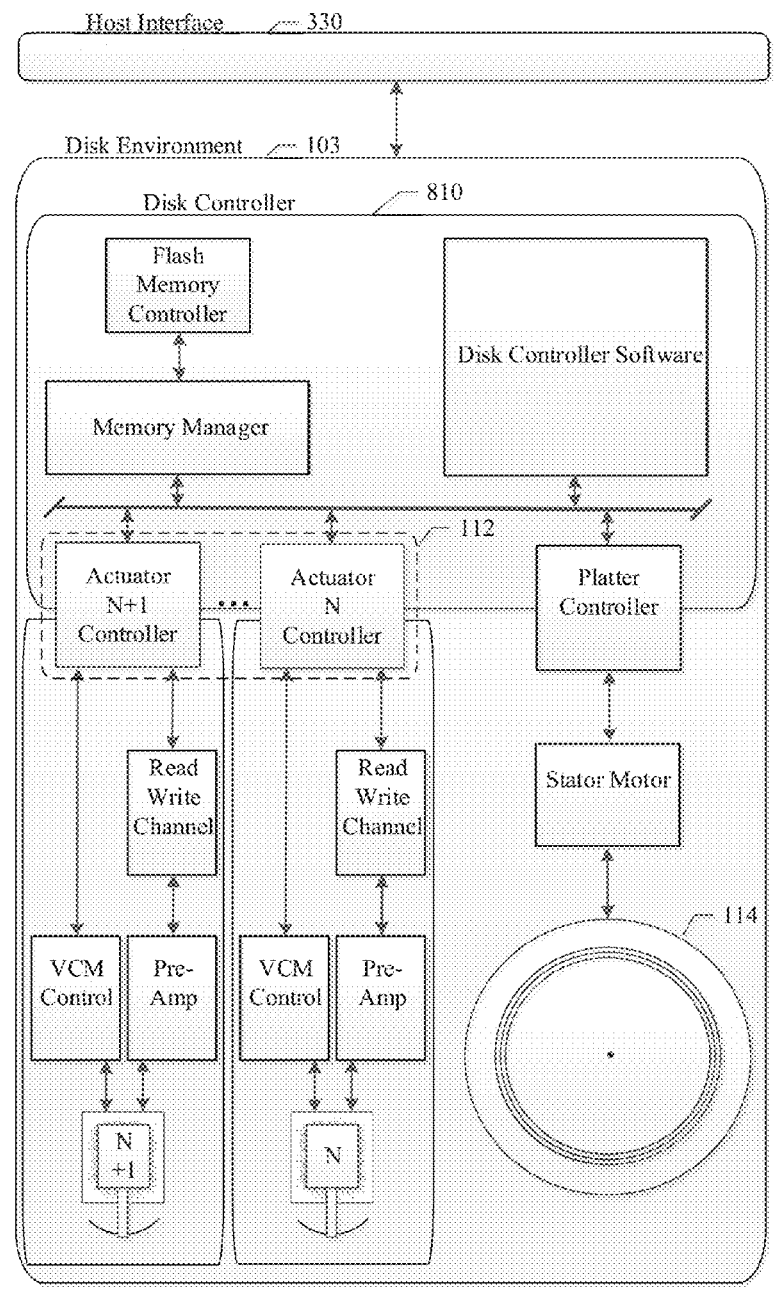
FIG. 7 illustrates the disk environment in another embodiment of the multiple actuator data storage system.

FIG. 7 illustrates the disk environment 103 in another embodiment of the multiple actuator data storage system. As shown, the disk environment 103 can include the disk controller 810, a plurality of actuator controllers 112, and a data storage medium, such as disk 114. The disk controller 810 can include a disk controller software module and a memory manager module. These modules can store and execute the processing instructions as described above for performing the operations of the multiple actuator data storage system. In a particular embodiment, the disk controller 810 can include a flash memory and flash memory controller for persistent storage of control instructions, control data, disk profile data, or portions of user data. In a particular embodiment, banks of flash memory can be configured to operate as virtual actuators or virtual data storage devices. In this manner, user data received from or to be transferred to the host environment can be stored in virtual storage devices in flash memory instead of (or in combination with) being stored on the data storage medium 114. Additionally, a portion of flash memory in the disk controller 810 can be used as a data cache for buffering data being transferred into or out of the data storage system. The amount of flash memory in the disk controller 810 can be increased or decreased depending on particular system requirements.

Referring still to FIG. 7, the plurality of actuator controllers 112 can each be coupled to a read/write channel module, a VCM control module, and a pre-amplifier module. The VCM control module and the pre-amplifier module are coupled to the actuator, which moves an actuator arm and read/write head to a desired location on disk 114. As described above, each actuator can be mounted on a different shaft at different locations around the surface of the disk 114. The motion of the disk 114 itself can be controlled by the disk controller software module using a platter controller and stator motor coupled to the disk 114. As a result, the disk environment 103 of an example embodiment can provide a multiple actuator data storage system, which can operate in the manner described in more detail below.

Figure 8:
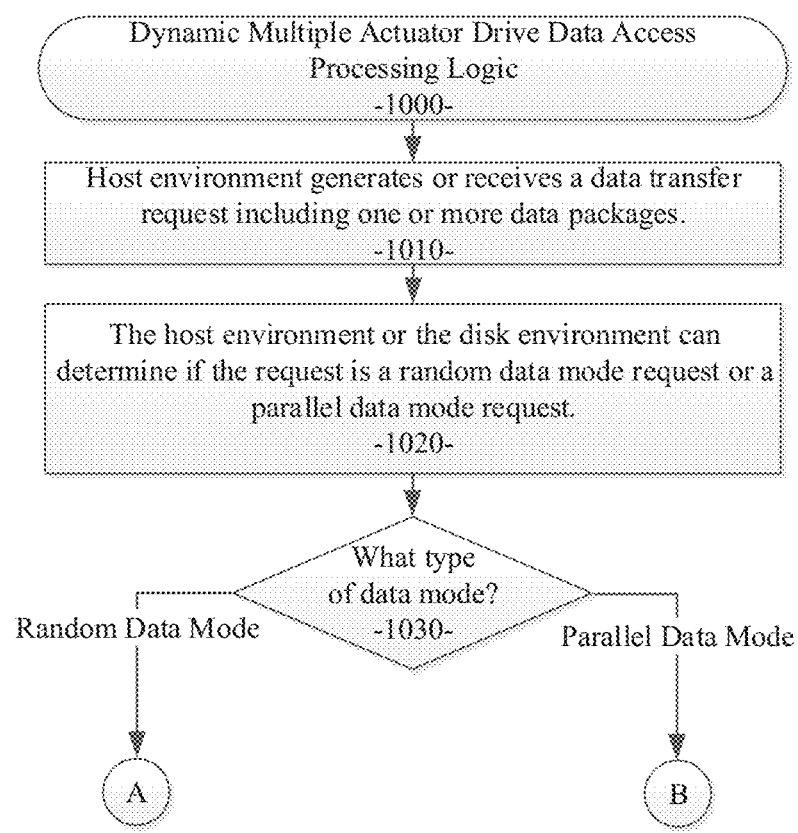
FIG. 8 is a processing flow diagram illustrating example embodiments of a dynamic multiple actuator drive data access method using the data storage system of an example embodiment as described herein.
Figure 9:
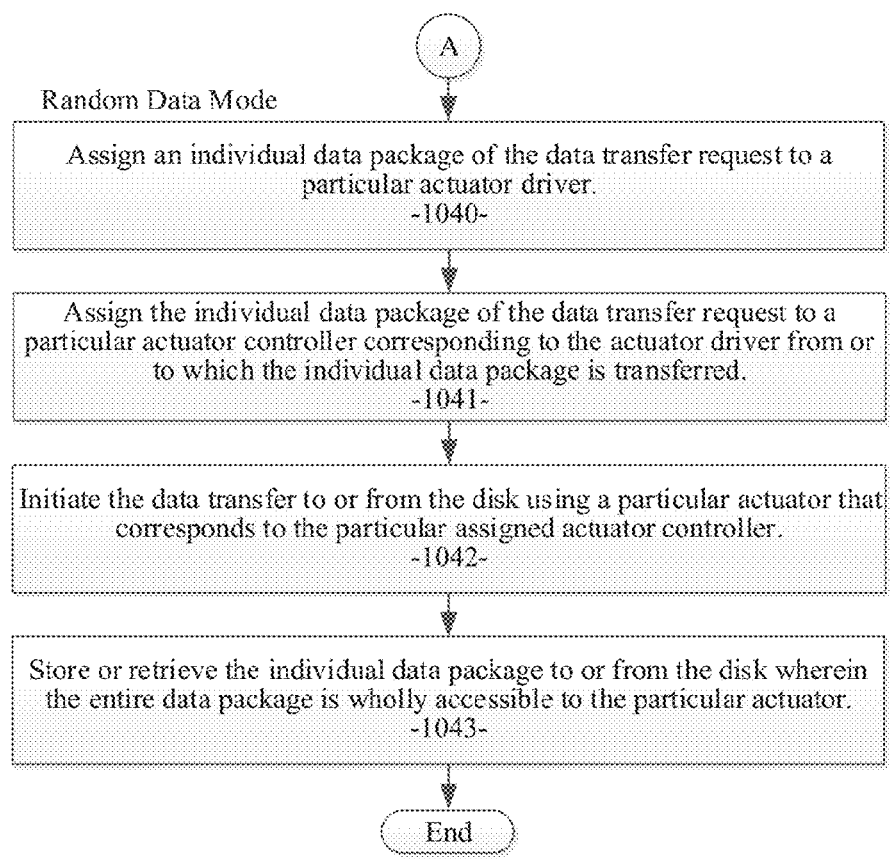
FIG. 9 is a processing flow diagram illustrating the processing performed for a random access mode data transfer request in an example embodiment.
Figure 10:
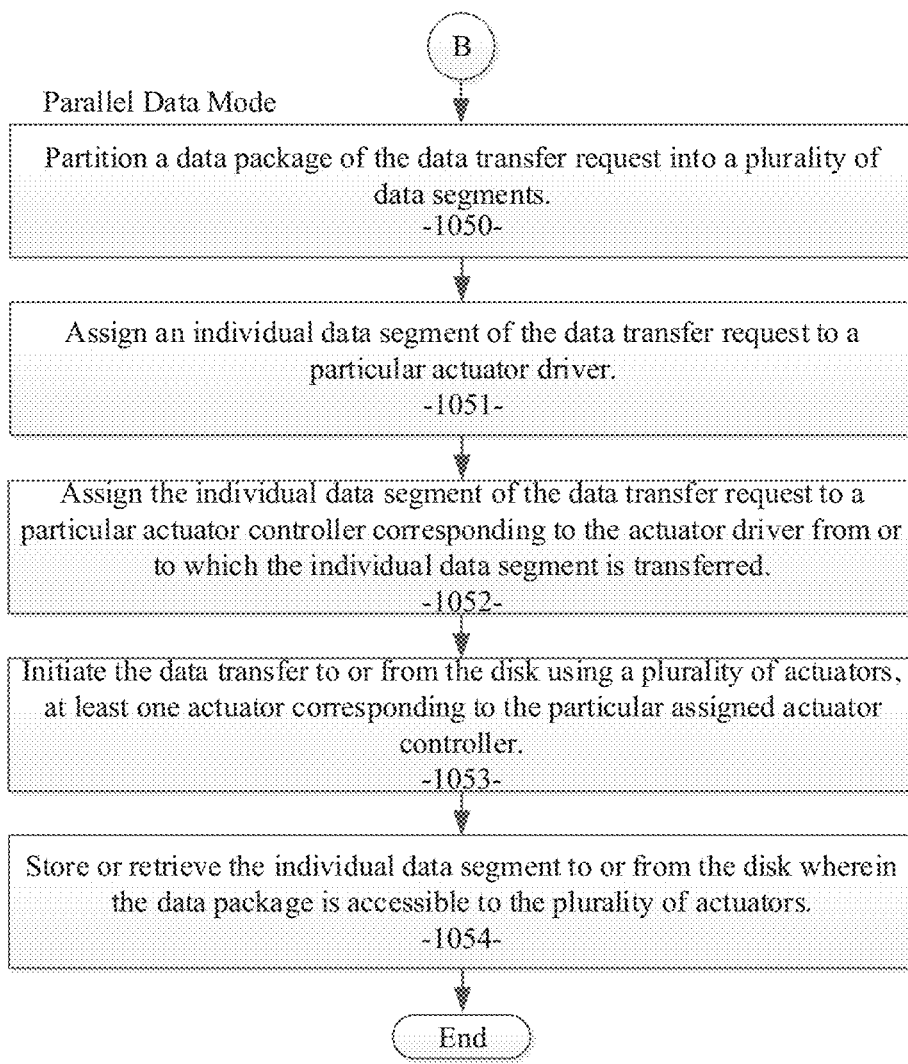
FIG. 10 is a processing flow diagram illustrating the processing performed for a parallel access mode data transfer request in an example embodiment.

Referring now to FIGS. 8 through 10, processing flow diagrams illustrate example embodiments of a dynamic multiple actuator drive data access method 1000 using the data storage system 100 as described herein. The dynamic multiple actuator drive data access method 1000 of an example embodiment can be deployed in an electronic device, such as electronic device 700 described below in which a data storage system 100 and a processing system can be installed. The dynamic multiple actuator drive data access method 1000 can be used to dynamically and programmatically modify the behavior of the actuators of the data storage system 100 based on a data transfer mode of the subsystems of the electronic device 700. In the example embodiments described herein, the electronic device 700 can be configured by default to use a particular data access mode of the data storage system 100.

Referring now to FIG. 8, the host environment of an example embodiment can generate or receive a data transfer request including one or more data packages (processing block 1010). The host environment or the disk environment to which it is connected can determine if the request is a random data mode request or a parallel data mode request (processing block 1020). If the request is a random data mode request, processing continues at the bubble labeled A illustrated in FIG. 9 where the random data mode request is processed. If the request is a parallel data mode request, processing continues at the bubble labeled B illustrated in FIG. 10 where the parallel data mode request is processed (decision block 1030).

Referring now to FIG. 9, the processing performed for a random access mode data transfer request in an example embodiment is illustrated. In response to the random access mode data transfer request, the data storage system 100 can assign an individual data package of the data transfer request to a particular actuator driver (processing block 1040). The data storage system 100 can also assign each individual data package of the data transfer request to a particular actuator controller corresponding to the actuator driver from or to which the individual data package is transferred (processing block 1041). The data storage system 100 can initiate the data transfer to or from the disk 114 using a particular actuator that corresponds to the particular assigned actuator controller (processing block 1042). The data storage system 100 can store or retrieve the individual data package to or from the disk wherein the entire data package is wholly accessible to the particular actuator (processing block 1043).

Referring now to FIG. 10, the processing performed for a parallel access mode data transfer request in an example embodiment is illustrated. In response to the parallel access mode data transfer request, the data storage system 100 can partition a data package of the data transfer request into a plurality of data segments (processing block 1050). The data storage system 100 can also assign an individual data segment of the data transfer request to a particular actuator driver (processing block 1051). The data storage system 100 can assign each individual data segment of the data transfer request to a particular actuator controller corresponding to the actuator driver from or to which the individual data segment is transferred (processing block 1052). The data storage system 100 can initiate the data transfer to or from the disk using a plurality of actuators, at least one actuator corresponding to the particular assigned actuator controller (processing block 1053). The data storage system 100 can store or retrieve the individual data segment to or from the disk wherein the data package (the combination of all component data segments) is accessible to the plurality of actuators (processing block 1054).

Figure 11:
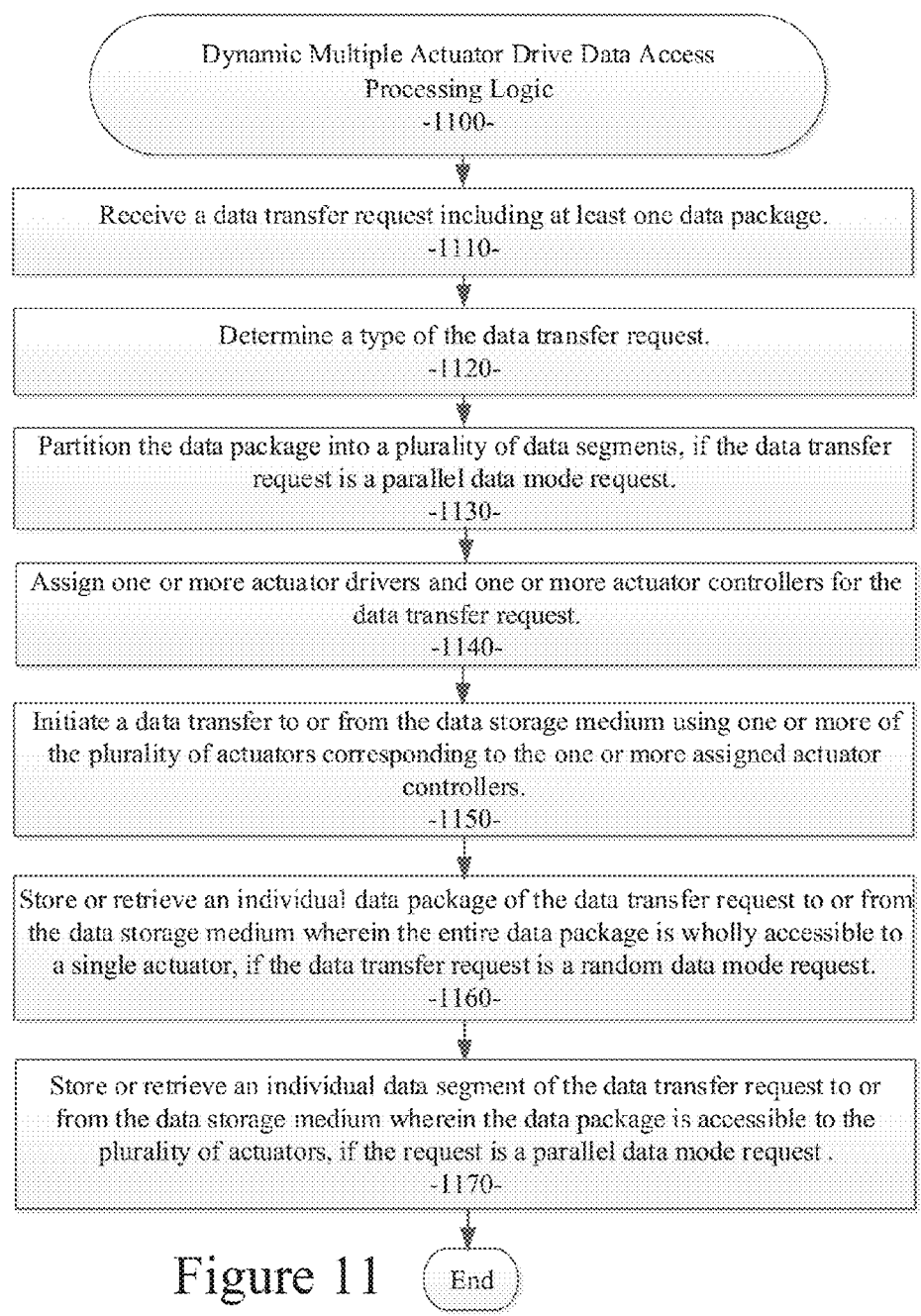
FIG. 11 is a processing flow chart illustrating an example embodiment of a method as described herein.

Referring now to FIG. 11, a processing flow diagram illustrates an example embodiment of a data access method 1100 for a data storage system as described herein. The method 1100 of an example embodiment includes: receiving a data transfer request including at least one data package (processing block 1110); determining a type of the data transfer request (processing block 1120); partitioning the data package into a plurality of data segments, if the data transfer request is a parallel data mode request (processing block 1130); assigning one or more actuator drivers and one or more actuator controllers for the data transfer request (processing block 1140); initiating a data transfer to or from the data storage medium using one or more of the plurality of actuators corresponding to the one or more assigned actuator controllers (processing block 1150); storing or retrieving an individual data package of the data transfer request to or from the data storage medium wherein the entire data package is wholly accessible to a single actuator, if the data transfer request is a random data mode request (processing block 1160); and storing or retrieving an individual data segment of the data transfer request to or from the data storage medium wherein the data package is accessible to the plurality of actuators, if the request is a parallel data mode request (processing block 1170).

Figure 12:
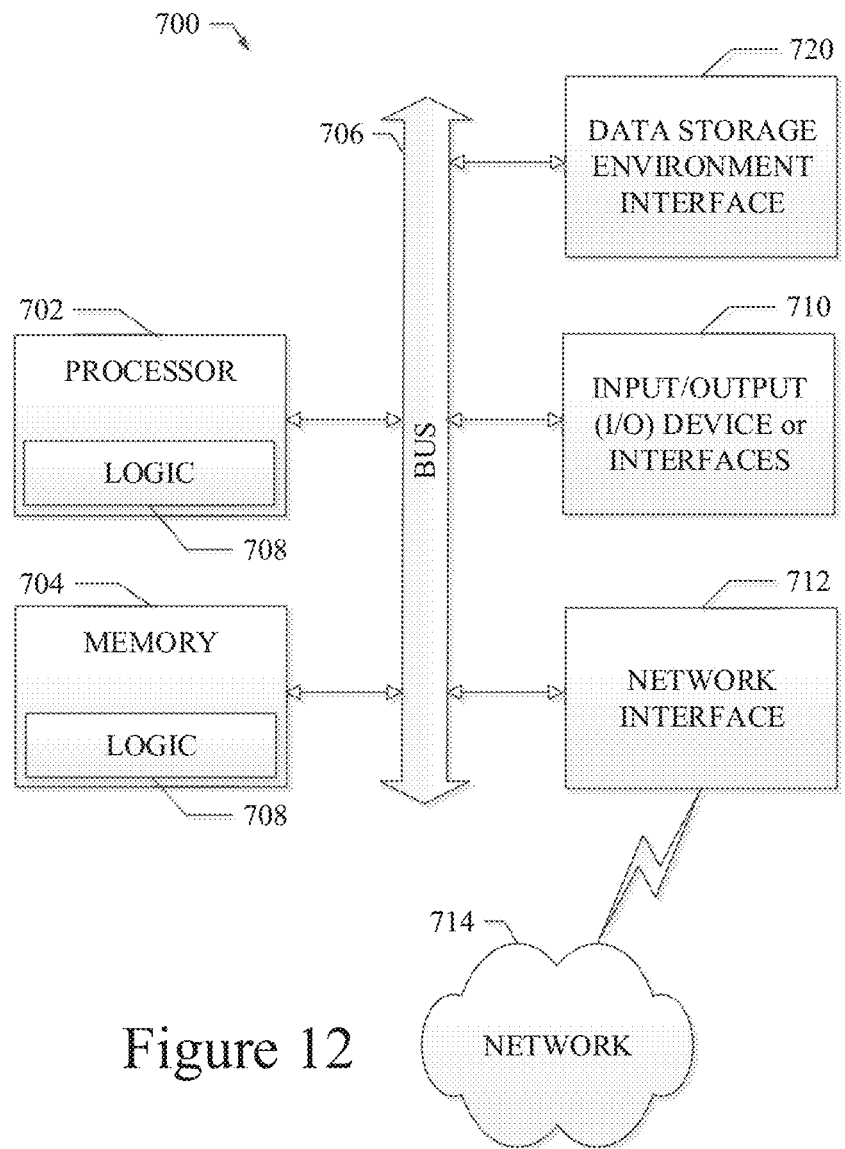
FIG. 12 shows a diagrammatic representation of a machine in the example form of a computing and/or communication system within which a set of instructions when executed and/or processing logic when activated may cause the machine to perform any one or more of the methodologies described and/or claimed herein.

FIG. 12 shows a diagrammatic representation of a machine in the example form of a stationary computing system, a mobile computing system, and/or a communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing and/or communication system 700 can include a data processor 702 (e.g., a System-on-a-Chip (SoC), general processing core, graphics core, and optionally other processing logic) and a memory 704, which can communicate with each other via a bus or other data transfer system 706. The computing and/or communication system 700 may further include various input/output (I/O) devices and/or interfaces 710, such as a touchscreen display, a hardware data interface connector, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the computing and/or communication system 700 and another computing or communication system via network 714. Data storage environment interface 720 provides the data interface to the data storage system 100 as described above.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A data storage system comprising:
   a data storage medium having a disk with magnetically encoded data;
   a plurality of actuators for accessing data stored on the data storage medium, the plurality of actuators each being mounted on a different shaft at different locations around a surface of the data storage medium, the different locations being different angular positions relative to the center of the data storage medium, the different locations not being concentric, each actuator of the plurality of actuators being physically configured to access only a portion of the available tracks on the data storage medium and different subsets of the available tracks, each actuator being positioned adjacent to a subset of the available tracks and an arm of each actuator being physically configured to rotate only through a pre-defined subset of tracks; and
   a disk controller configured to:
      receive a data transfer request including at least one data package;
      determine a type of the data transfer request;
      partition the data package into a plurality of data segments, if the data transfer request is a parallel data mode request;
      assign one or more actuator drivers and one or more actuator controllers for the data transfer request;
      initiate a data transfer to or from the data storage medium using one or more of the plurality of actuators corresponding to the one or more assigned actuator controllers;
      store or retrieve an individual data package of the data transfer request to or from the data storage medium wherein the entire data package is wholly accessible to a single actuator, if the data transfer request is a random data mode request; and
      store or retrieve an individual data segment of the data transfer request to or from the data storage medium wherein the data package is accessible to the plurality of actuators, if the request is a parallel data mode request.

2. The data storage system of claim 1 wherein the data transfer request includes information indicative of the type of the data transfer request.

3. The data storage system of claim 1 wherein the type of the data transfer request can be inferred from the data transfer request.

4. The data storage system of claim 1 wherein the type of the data transfer request can be determined from a profile.

5. The data storage system of claim 1 further including an interface to a host environment.

6. A method comprising:
   providing a data storage medium and a plurality of actuators for accessing data stored on the data storage medium, the data storage medium having a disk with magnetically encoded data, the plurality of actuators each being mounted on a different shaft at different locations around a surface of the data storage medium, the different locations being different angular positions relative to the center of the data storage medium, the different locations not being concentric, each actuator of the plurality of actuators being physically configured to access only a portion of the available tracks on the data storage medium and different subsets of the available tracks, each actuator being positioned adjacent to a subset of the available tracks and an arm of each actuator being physically configured to rotate only through a pre-defined subset of tracks;
   receiving a data transfer request including at least one data package;
   determining a type of the data transfer request;
   partitioning the data package into a plurality of data segments, if the data transfer request is a parallel data mode request;
   assigning one or more actuator drivers and one or more actuator controllers for the data transfer request;
   initiating a data transfer to or from the data storage medium using one or more of the plurality of actuators corresponding to the one or more assigned actuator controllers;
   storing or retrieving an individual data package of the data transfer request to or from the data storage medium wherein the entire data package is wholly accessible to a single actuator, if the data transfer request is a random data mode request; and
   storing or retrieving an individual data segment of the data transfer request to or from the data storage medium wherein the data package is accessible to the plurality of actuators, if the request is a parallel data mode request.

7. The method of claim 6 wherein the data transfer request includes information indicative of the type of the data transfer request.

8. The method of claim 6 wherein the type of the data transfer request can be inferred from the data transfer request.

9. The method of claim 6 wherein the type of the data transfer request can be determined from a profile.

10. The method of claim 6 further including interfacing with a host environment.

* * * * *